US012725525B2

(12) United States Patent
Sharma et al.

(10) Patent No.: US 12,725,525 B2
(45) Date of Patent: Sep. 1, 2026

(54) VEHICLE SYSTEMS AND METHODS FOR PROVIDING OPTIMAL SPATIAL AND TEMPORAL EXIT LANE MERGING RECOMMENDATIONS

(71) Applicant: GM GLOBAL TECHNOLOGY OPERATIONS LLC, Detroit, MI (US)

(72) Inventors: Manoj Kumar Sharma, Troy, MI (US); Akilesh Rajavenkatanarayanan, Clinton Township, MI (US); Donald K. Grimm, Utica, MI (US); Shu Chen, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 18/911,578

(22) Filed: Oct. 10, 2024

(65) Prior Publication Data

US 2026/0105845 A1 Apr. 16, 2026

(51) Int. Cl.
*G08G 1/16* (2006.01)

(52) U.S. Cl.
CPC .................................... *G08G 1/167* (2013.01)

(58) Field of Classification Search
CPC ........ G08G 1/167; G08G 1/163; G08G 1/052; G08G 1/096716; G08G 1/166; G08G 1/164; B60W 30/18163; B60W 2720/106; H04W 4/021; H04W 4/40
See application file for complete search history.

(56) References Cited

U.S. PATENT DOCUMENTS

| | | | | |
|---|---|---|---|---|
| 9,672,734 | B1 | 6/2017 | Ratnasingam | |
| 2014/0297181 | A1 | 10/2014 | Kondo et al. | |
| 2018/0234901 | A1* | 8/2018 | Suh | H04W 36/322 |
| 2019/0196472 | A1* | 6/2019 | Körner | B60W 60/0016 |

(Continued)

FOREIGN PATENT DOCUMENTS

| | | | |
|---|---|---|---|
| DE | 102014002115 | A1 | 8/2015 |
| DE | 102015015944 | A1 | 6/2017 |

(Continued)

OTHER PUBLICATIONS

German Office Action from counterpart DE1020241362375, dated Oct. 6, 2025.

(Continued)

*Primary Examiner* — Ashley L Redhead, Jr.

(57) ABSTRACT

A vehicle system includes a control module and a display module. The control module is configured to identify road segments of a first lane for merging into a second lane, determine one or more reliability scores for each road segment, each reliability score for each road segment being specific to a different driving condition, select a road segment with the highest reliability score having the driving condition that corresponds to a current driving condition, and identify a portion of the selected road segment optimal for merging into the second lane based on a probability of having a time gap to change lanes and a difference in vehicle speeds between the lanes. The display module is configured to output a visual representation including the identified portion to indicate a recommendation of where to merge into the second lane. Other example vehicle systems and vehicle control methods are also disclosed.

20 Claims, 9 Drawing Sheets

(56) References Cited

U.S. PATENT DOCUMENTS

| | | | |
|---|---|---|---|
| 2019/0316919 | A1* | 10/2019 | Keshavamurthy ........................... G08G 1/096844 |
| 2019/0329770 | A1 | 10/2019 | Rajab et al. |
| 2020/0124438 | A1 | 4/2020 | Fowe |
| 2020/0124439 | A1 | 4/2020 | Fowe |
| 2020/0342760 | A1 | 10/2020 | Vassilovski et al. |
| 2020/0361495 | A1 | 11/2020 | Namba |
| 2020/0377083 | A1* | 12/2020 | Kokaki ............. B60W 60/0016 |
| 2021/0104155 | A1 | 4/2021 | Xu et al. |
| 2021/0156708 | A1* | 5/2021 | Wojcik ............... G01C 21/3697 |
| 2022/0048535 | A1 | 2/2022 | Niendorf et al. |
| 2023/0339470 | A1 | 10/2023 | Hay et al. |
| 2024/0116510 | A1 | 4/2024 | Li et al. |
| 2025/0171024 | A1 | 5/2025 | Saito et al. |
| 2025/0296576 | A1 | 9/2025 | Liu et al. |

FOREIGN PATENT DOCUMENTS

| | | | |
|---|---|---|---|
| DE | 102018107508 | A1 | 10/2018 |
| DE | 102020117160 | B3 | 10/2021 |
| DE | 102020117159 | A1 | 12/2021 |
| DE | 102022109973 | A1 | 10/2023 |
| DE | 102023117375 | A1 | 1/2025 |

OTHER PUBLICATIONS

German Office Action from counterpart DE1020241351039, dated May 12, 2025.

German Office Action from counterpart DE1020241344016, dated Jun. 13, 2025.

* cited by examiner

VEHICLE SYSTEMS AND METHODS FOR PROVIDING OPTIMAL SPATIAL AND TEMPORAL EXIT LANE MERGING RECOMMENDATIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for providing optimal spatial and temporal exit lane merging recommendations, and more particularly to providing optimal exit lane merging recommendations based in part on crowdsourced telemetry data.

Vehicles often include navigation systems for vehicle tracking and providing instructions about upcoming maneuvers to reach desired locations. In such examples, the instructions may be provided to drivers of the vehicles or used for vehicle control in autonomous driving applications in the vehicles. In some scenarios, the navigation systems may rely on crowdsourced data from other vehicles to generate the instructions.

SUMMARY

A vehicle system for providing an optimal road segment recommendation to make a desired lane change for a vehicle, includes a control module and a display module in communication with the control module. The control module is configured to identify, based on crowdsourced data from a plurality of vehicles over a period of time that have traveled through a defined region of a road, a plurality of road segments in the defined region of a first lane for merging into a second lane. The crowdsourced data includes a frequency of which each vehicle of the plurality of vehicles has traveled through the defined region of the road. The control module is further configured to determine one or more reliability scores for each road segment in the defined region of the road based on the frequency of which each vehicle of the plurality of vehicles has traveled into the defined region of the road, each reliability score for each road segment being specific to a different driving condition, select a road segment of the road segments with the highest reliability score having the driving condition that corresponds to a current driving condition associated with the vehicle, and identify a portion of the selected road segment optimal for merging from the first lane into the second lane based on a probability of having a time gap to change lanes and a difference in vehicle speeds between the first lane and the second lane. The display module is configured to output a visual representation of the selected road segment including the identified portion highlighted to indicate a recommendation of where to merge from the first lane into the second lane.

In other features, the vehicle system further includes a vehicle control module in communication with the control module. The vehicle control module is configured to control at least one operation of the vehicle based on the identified portion of the selected road segment.

In other features, the plurality of road segments in the defined region correspond to a set of road segments most used by the plurality of vehicles to merge into the second lane.

In other features, the control module is configured to determine familiarity scores for the plurality of vehicles in each road segment based on the frequency of which the plurality of vehicles have traveled through the defined region of the road.

In other features, the control module is configured to determine the one or more reliability scores for each road segment based on the familiarity scores for that road segment.

In other features, the driving condition includes at least one of a different time of day, a different road condition, and a different weather condition.

In other features, the crowdsourced data includes a frequency of braking incidents for the plurality of vehicles in the defined region of the road.

In other features, the control module is configured to modify the one or more reliability scores for each road segment based on the frequency of braking incidents.

In other features, the control module is configured to modify the probability of having a time gap to change lanes based on a cognitive status of a driver of the vehicle.

In other features, the control module is configured to modify the probability of having a time gap to change lanes based on a condition of the road.

A vehicle system for providing an optimal road segment recommendation to make a desired lane change for a vehicle, includes a control module and a vehicle control module in communication with the control module. The control module is configured to identify, based on crowdsourced data from a plurality of vehicles over a period of time that have traveled through a defined region of a road, a plurality of road segments in the defined region of a first lane for merging into a second lane. The crowdsourced data includes a frequency of which each vehicle of the plurality of vehicles has traveled through the defined region of the road. The control module is further configured to determine one or more reliability scores for each road segment in the defined region of the road based on the frequency of which each vehicle of the plurality of vehicles has traveled into the defined region of the road, each reliability score for each road segment being specific to a different driving condition, select a road segment of the road segments with the highest reliability score having the driving condition that corresponds to a current driving condition associated with the vehicle, and identify a portion of the selected road segment optimal for merging from the first lane into the second lane based on a probability of having a time gap to change lanes and a difference in vehicle speeds between the first lane and the second lane. The vehicle control module is configured to control the vehicle to merge into the second lane in the identified portion of the selected road segment.

In other features, the plurality of road segments in the defined region correspond to a set of road segments most used by the plurality of vehicles to merge into the second lane.

In other features, the control module is configured to determine familiarity scores for the plurality of vehicles in each road segment based on the frequency of which the plurality of vehicles have traveled through the defined region of the road.

In other features, the control module is configured to determine the one or more reliability scores for each road segment based on the familiarity scores for that road segment.

In other features, the driving condition includes at least one of a different time of day, a different road condition, and a different weather condition.

In other features, the crowdsourced data includes a frequency of braking incidents for the plurality of vehicles in the defined region of the road.

In other features, the control module is configured to modify the one or more reliability scores for each road segment based on the frequency of braking incidents.

In other features, the control module is configured to modify the probability of having a time gap to change lanes based on a cognitive status of a driver of the vehicle.

In other features, the control module is configured to modify the probability of having a time gap to change lanes based on a condition of the road.

A vehicle control method for providing an optimal road segment recommendation to make a desired lane change for a vehicle, includes identifying, based on crowdsourced data from a plurality of vehicles over a period of time that have traveled through a defined region of a road, a plurality of road segments in the defined region of a first lane for merging into a second lane. The crowdsourced data includes a frequency of which each vehicle of the plurality of vehicles has traveled through the defined region of the road. The vehicle control method further includes determining one or more reliability scores for each road segment in the defined region of the road based on the frequency of which each vehicle of the plurality of vehicles has traveled into the defined region of the road, each reliability score for each road segment being specific to a different driving condition, selecting a road segment of the road segments with the highest reliability score having the driving condition that corresponds to a current driving condition associated with the vehicle, identifying a portion of the selected road segment optimal for merging from the first lane into the second lane based on a probability of having a time gap to change lanes and a difference in vehicle speeds between the first lane and the second lane, and outputting a visual representation of the selected road segment including the identified portion highlighted to indicate a recommendation of where to merge from the first lane into the second lane.

In other features, the vehicle control method further includes controlling the vehicle to merge into the second lane in the identified portion of the selected road segment.

In other features, the vehicle control method further includes at least one of modifying the one or more reliability scores for each road segment based on a frequency of braking incidents for the plurality of vehicles in the defined region of the road, modifying the probability of having a time gap to change lanes based on a cognitive status of a driver of the vehicle, and modifying the probability of having a time gap to change lanes based on a condition of the road.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include navigation systems for providing instructions about upcoming maneuvers to reach desired locations. To provide such instructions, current navigation systems may rely on road level information (e.g. high-level maps) and crowdsourced data. Such navigation systems, however, lack awareness of lane level traffic information. This lack of awareness can result in missed exits (particularly for automated vehicles) and/or anxiety when a vehicle needs to position itself or a driver needs to position the vehicle in the correct lane for an upcoming maneuver.

The vehicle systems and vehicle control methods according to the present disclosure provide solutions for enabling lane traffic awareness to support comfortable navigation and merging experiences. For example, using traffic lane statistics derived from crowdsourced telemetry data, the vehicle systems and methods can provide a vehicle with spatial and temporal lane recommendations to improve the likelihood that the vehicle will meet its navigation goals (e.g., arrive at exit/entrance lane in time). Such lane recommendations may be incorporated into a map for a display in the vehicle and/or used for route planning in autonomous driving applications in the vehicle.

For example, a vehicle traveling along a road may need to take an exit to keep on its route. In such examples, the road may be a highway, such as a multi-lane highway and the route may be provided by a navigation system. In some scenarios, the exit location may be backed up due to traffic congestion occurring on the exit or lower-class road associated with the exit. To successfully navigate, a driver of the vehicle may need to ensure that he/she has enough time to maneuver into the exit lane. Otherwise, the driver will need to be re-rerouted to the next exit. In this scenario, the determination of when/where to maneuver into the exit lane may need to account for slowing and congested vehicle traffic in advance of the exit ramp to connect to the next leg of the route. As such, the vehicle systems and vehicle control methods herein can determine a lane change (or merge) feasibility based on an expected headway and, if desired, modify the feasibility based on hard braking data, as further explained herein. In such examples, the vehicle systems and vehicle control methods enable a display to assist the driver in performing the required lane change and/or enable vehicle control to perform the required lane change with sufficient time to meet navigation goals.

Figure 1:
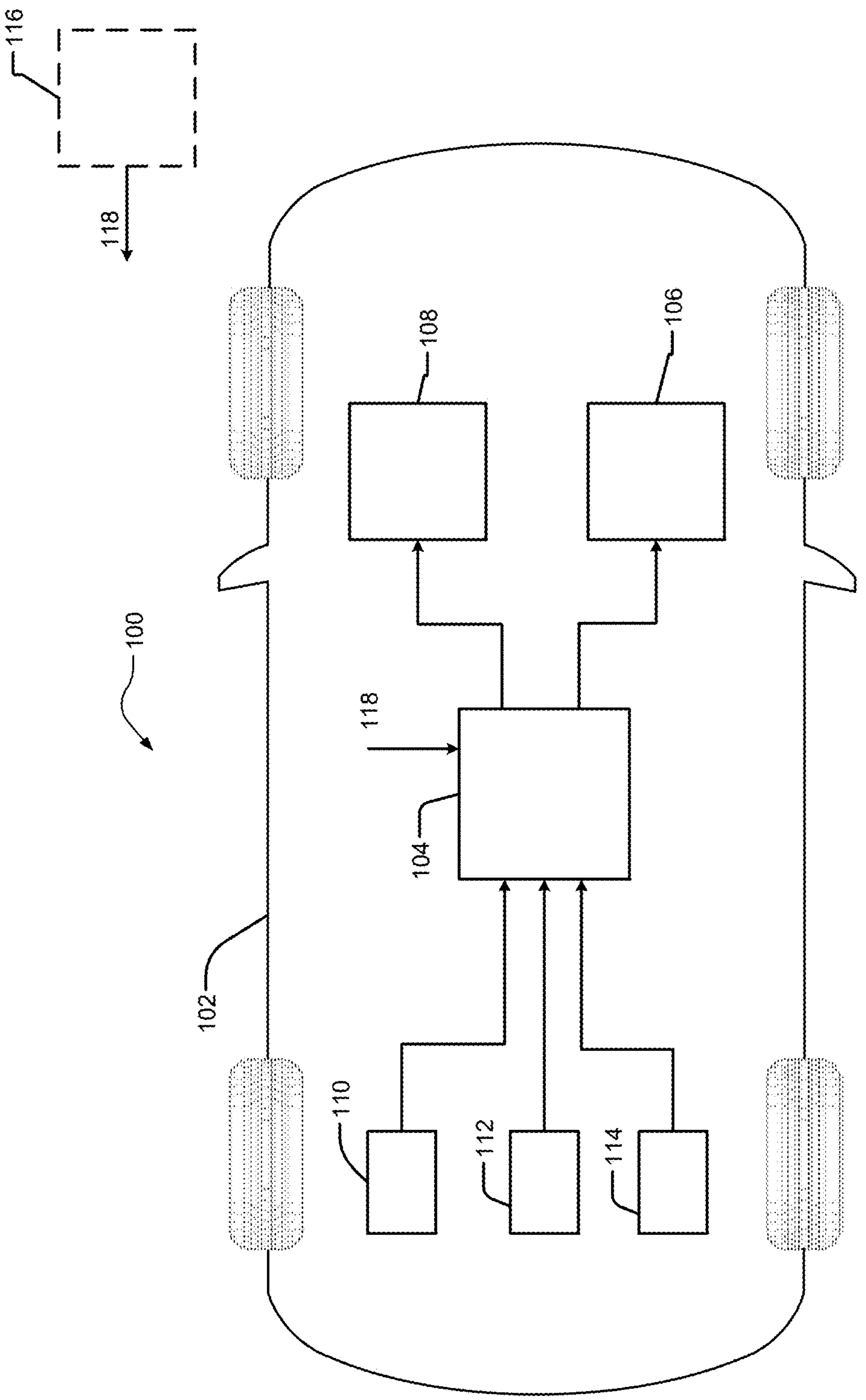
FIG. 1 is a block diagram of an example vehicle system for providing vehicle merge lane recommendations, according to the present disclosure.

Referring now to FIG. 1, a block diagram of an example vehicle system 100 is presented for providing vehicle lane recommendations for a vehicle 102 merging into a lane of a road. As shown in FIG. 1, the vehicle system 100 generally includes a control module 104 internal to the vehicle 102, a display module 106, a vehicle control module 108 for controlling at least one operation of the vehicle 102, and multiple onboard sensors 110, 112, 114. Although FIG. 1 illustrates the vehicle system 100 as including specific dedicated modules, it should be appreciated that one or more other modules may be employed if desired. For example, any combination of the modules (e.g., the control module 104, the display module 106, the vehicle control module 108, etc.) and/or the functionality thereof may be integrated into a single module or multiple different modules. Additionally, although FIG. 1 illustrates three onboard sensors 110, 112, 114, it should be appreciated that any number of sensors can be arranged on the vehicle 102 if desired.

The vehicle system 100 of FIG. 1 may be employable in any suitable vehicle, such as an autonomous vehicle, a semi-autonomous vehicle, etc. Additionally, the vehicle system 100 may be applicable to electric vehicles (e.g., a pure electric vehicle, a plug-in hybrid electric vehicle, etc.) and internal combustion engine (ICE) vehicles. In the example of FIG. 1, the vehicle system 100 is employed in the vehicle 102 (e.g., an autonomous vehicle).

In the example of FIG. 1, the onboard sensors 110, 112, 114, the display module 106, and the vehicle control module 108 are in communication with the control module 104. In such examples, the modules and sensors of the vehicle system 100 may share parameters via a network, such as a controller area network (CAN) and signals. For example, in FIG. 1, the control module 104 receives signals representing data from the sensors 110, 112, 114 and transmits signals to the display module 106 for displaying lane recommendations and the vehicle control module 108 for controlling vehicle operation.

In various embodiments, and as further explained herein, aspects of creating the vehicle lane recommendations may be implemented onboard the vehicle 102 itself and/or external to the vehicle 102. For example, the control module 104 may perform functions for creating spatial and temporal vehicle lane merging recommendations. In other examples, the vehicle system 100 may include an optional control module 116 external to the vehicle 102 and in communication with the control module 104 onboard the vehicle 102. In such examples, the control module 116 may perform some or all of the functions explained herein for creating spatial and temporal vehicle lane recommendations. For instance, and as further explained herein, the external (or remote) control module 116 may generally receive crowdsourced data, identify road segments for merging from one lane to another lane (e.g., an exit lane) based on the crowdsourced data, and determine reliability scores for the road segments. Then, the control module 104 may generally select one of the road segments and identify a portion of the selected road segment for merging. While the control functions for creating lane merging recommendations are explained below specific to both control modules 104, 116, it should be appreciated that either control module may separately implement the control functions itself.

In the example of FIG. 1, the control module 104 may receive one or more onboard inputs. For example, the onboard sensors 110, 112, 114 may detect one or more characteristics and provide one or more onboard inputs to the control module 104, such as vehicle acceleration, environmental data (e.g., characteristics of other vehicles, road conditions, weather conditions, etc.) external of the vehicle 102, driver characteristics (e.g., attentiveness of the driver, stress of the driver, drowsiness of the driver, etc.), etc. In such examples, the onboard sensors 110, 112, 114 may include, for example, external cameras (e.g., front camera modules, side camera modules, etc.), acceleration sensors, internal cameras (e.g., eye trackers, etc.), and/or any other suitable sensors. In some examples, the control module 104 may receive onboard inputs from automated driving systems, computer vision systems, etc. In various embodiments, some or all of the received onboard inputs from the onboard sensors 110, 112, 114 or otherwise may be transmitted to the control module 116.

Additionally, the control module 104 may receive one or more offboard inputs. Such offboard inputs may include, for example, data from one or more road databases, location data (e.g., from a global positioning system), and/or communications from vehicle-to-everything (V2X) systems, dedicated short range communications (DSRC) systems, cellular systems, etc. In such examples, some or all of the offboard inputs may be provided from the control module 116. More specifically, the some or all of the offboard inputs may be provided via one or more signals 118.

With continued reference to FIG. 1, the control module 116 receives crowdsourced data from vehicles, including possibly the vehicle 102, over a period of time that have traveled along the road. In such examples, the data may be telemetry data relating to, for example, vehicle characteristics. For instance, the crowdsourced data may include data relating to vehicle speeds, vehicle acceleration, vehicle deacceleration, location data, vehicle counts, frequency of travel, etc. In some examples, the location data may include, for example, latitudes, longitudes, headings, headways, and corresponding timestamps. In such examples, information may be ascertained from the crowdsourced data, such as a frequency (e.g., daily, weekly, etc.) of which a vehicle has traveled through a defined region of the road, a frequency or number of braking incidents for the vehicles in the defined region of the road, etc.

Then, the control module 116 identifies road segments along the road for merging from one lane to another lane based on the crowdsourced data. For example, the control module 116 may utilize portions (e.g., location data, vehicle counts, etc.) of the crowdsourced data specific to a defined region of the road to identify the road segments most used by the vehicles (providing the crowdsourced data) to merge into another lane (e.g., an exit lane). In such examples, the defined region may be an area of interest of the road near an exit. As one example, the defined region may be between where an exit lane becomes available for use (e.g., appears, dashed road lines, etc.) and where the exit lane becomes unavailable for use (e.g., begins to split from the road, solid road lines, etc.).

Figure 2:
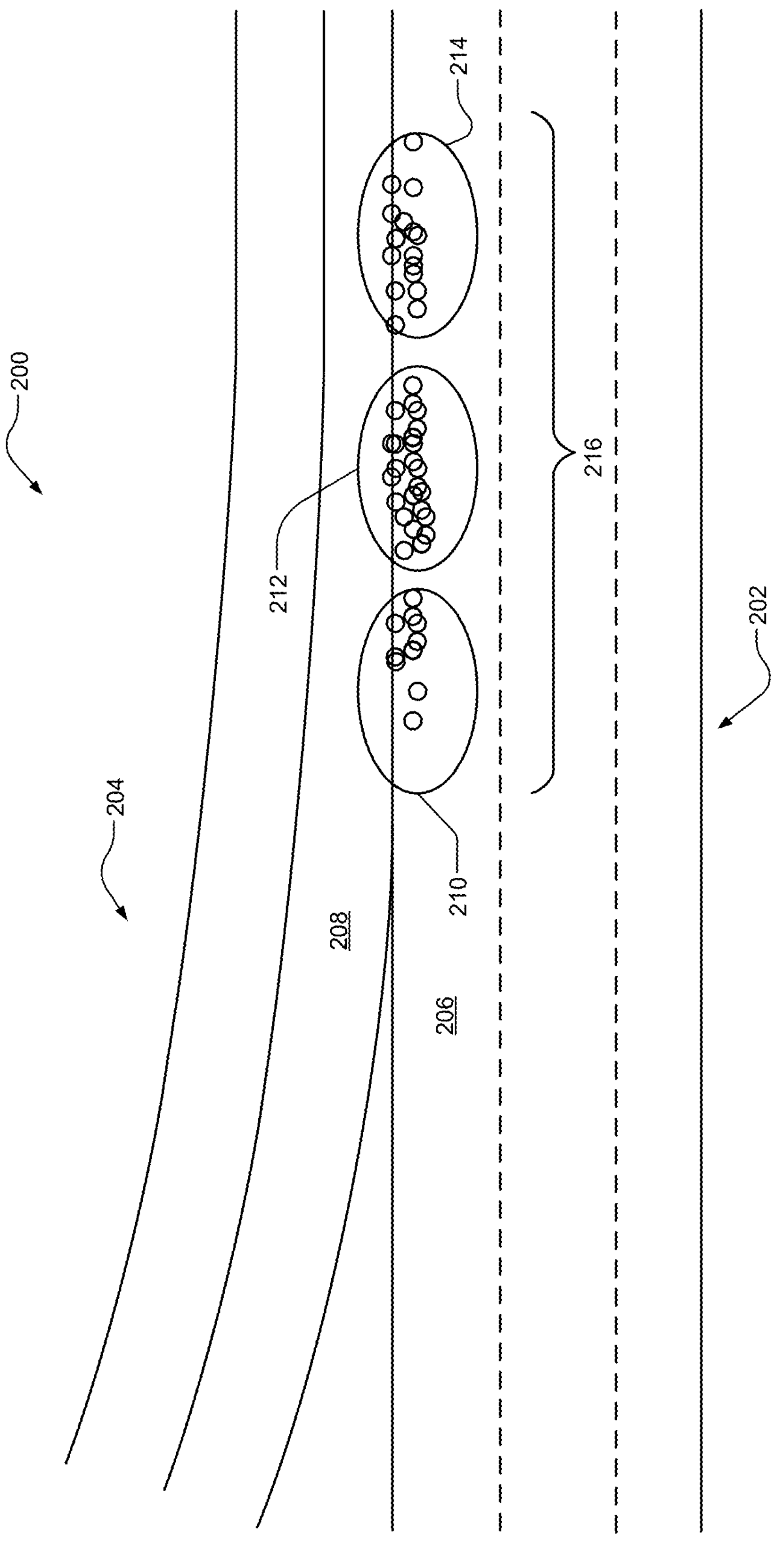
FIG. 2 is a map showing road segments and clustered location data identified by the vehicle system of FIG. 1, according to the present disclosure.

For example, FIG. 2 depicts a map 200 showing identified road segments. Specifically, in FIG. 2, the map 200 includes a road 202 and an exit 204. In such examples, the control module 116 may cluster data (shown by circles) in a defined region 216 relating to where vehicles have merged from a lane 206 of the road 202 to a lane 208 of the exit 204. Then, the control module 116 may identify a road segment 210, 212, 214 associated with each cluster. In other words, the clusters represent the road segments 210, 212, 214 where most of the vehicles merge to the exit lane 208. Although the example of FIG. 2 depicts three road segments, it should be appreciated that more or less road segments may be identified if desired and/or based on the clustered data, the defined region, etc.

With continued reference to FIGS. 1-2, the control module 116 then determines reliability scores for the road segments 210, 212, 214 in the defined region 216 of the road 202. In such examples, the reliability scores may be determined based on merged location data of the vehicles providing the crowdsourced data and that traveled into the defined region 216 of the road 202. For example, the control module 116 may determine a reliability score for each road segment 210, 212, 214 based on the frequency of which each vehicle has traveled into the defined region 216 of the road 202. As such, each reliability score generally represents a level of reliability associated with the crowdsourced data.

In various embodiments, the control module 116 may determine one or multiple reliability scores for each road segment 210, 212, 214. For example, each reliability score for a road segment may be determined and specific to a different driving situation or condition, such as morning, afternoon, nighttime, bad weather, etc. In such examples, the control module 116 may generate multiple clusters based on the location data specific to each driving condition and then determine a reliability score for each road segment and driving condition. In such examples, the driving condition may be a different time of day (e.g., 7:30 AM, morning, morning rush hour, afternoon drive, evening rush hour, after dark, etc.), a different day (e.g., Monday, Friday, Sunday, weekday, weekend, etc.), a road condition (e.g., icy, wet, dry, etc.), a weather condition (e.g., foggy, raining, snowing, etc.), etc.

In some examples, the control module 116 may determine each reliability score based on the area familiarity with the road 202 and/or the exit 204 of the vehicles providing the crowdsourced data. For example, the control module 116 may determine familiarity scores for the vehicles in each road segment 210, 212, 214 based on the frequency of which the vehicles have traveled through the defined region 216 of the road 202 and then determine the reliability scores for the road segments based on the familiarity scores.

As one example, a reliability score for a road segment may be determined according to equation (1) below in which a vehicle count (V) is divided based on the area familiarity of the vehicles. In this example, the reliability score is computed by multiplying each vehicle count (V) for a different level of familiarity and a corresponding weight value (ω) and then summing the results. The vehicle counts may be obtained from the crowdsourced data.

$$R_{Score} = \sum[\omega_H V_1 + \omega_M V_2 + \omega_L V_3 + \omega_0 V_4] \quad \text{Equation (1)}$$

In equation (1) above, $V_1$ represents the number of vehicles (or a vehicle count) which pass the exit 204 every day (e.g., every weekday), $V_2$ represents the number of vehicles which pass the exit 204 at least one a week, $V_3$ represents the number of vehicles which pass the exit 204 a few times (e.g., less than once a week, etc.), and $V_4$ represents the number vehicles which are new to the exit 204 (e.g., have never passed the exit 204). Additionally, in equation (1), $\omega_H$ represents a high reliability/familiarity score weight, $\omega_m$ represents a medium reliability/familiarity score weight, $\omega_L$ represents a low reliability/familiarity score weight, and $\omega_0$ represents a zero reliability/familiarity score weight. In such examples, the high reliability/familiarity score weight is the largest value (e.g., most weight) whereas the low reliability/familiarity score weight is the lowest value (e.g., least weight). The corresponding weight values (ω) for each vehicle count may be defined and tuned as desired. As example only, $\omega_H$ may be 0.8, $\omega_m$ may be 0.5, $\omega_L$ may be 0.2, and $\omega_0$ may be zero.

In some examples, some or all of the reliability scores may be modified one or more times if desired. For example, the control module 116 may modify one or more reliability scores for each road segment 210, 212, 214 based on a frequency of braking incidents in the road segment. In such examples, the control module 116 may identify a number of hard braking incidents in a road segment from the crowdsourced telemetry data, and then modify a reliability score accordingly. In this example, hard braking incidents may be defined as speed decreases that are greater than or equal to a defined threshold (e.g., 20 kilometers/hour/second, etc.). As one example, the control module 116 may determine a modified reliability score ($R_{Score-mod}$) according to equation (2) below.

$$R_{Score-mod} = R_{Score} - \sum \alpha_i \delta_i \quad \text{Equation (2)}$$

In equation (2), i represents the number of braking incidents (e.g., hard braking incidents) and alpha (∝) represents a weight based on the brake intensity, delta (δ) is a fixed value reliability score decrement per hard braking incident, and $R_{score}$ represents the original reliability score.

Additionally, in some embodiments, the control module 116 may modify one or more reliability scores for each road segment 210, 212, 214 based on the total time taken to merge by all vehicles from that road segment. As one example, the control module 116 may determine a modified reliability score ($R_{Score-mod2}$) according to equation (3) below. In equation (3), j represents the number of vehicles merged to the exit lane 208 of FIG. 2 at a given instance, beta (β) is a scaling parameter, $t_j$ represents a time for the vehicle in question to exit, to represents a designated time of exit, and $R_{Score-mod}$ represents the previously modified reliability score in equation (2). In other examples, equation (3) may include $R_{Score}$ (the original reliability score) instead of $R_{Score-mod}$.

$$R_{Score-mod2} = R_{Score-mod} - \sum_j \beta_j (t_j - t_0) \quad \text{Equation (3)}$$

In various embodiments, the control module 116 may store each of the determined reliability scores in a database. The stored reliability scores may be modified as explained above or not. In such examples, the database may include segment information relating to the road segments 210, 212, 214 corresponding to the reliability scores, driving conditions corresponding to the reliability scores, etc. This database (or data therein) may be accessible and/or provided to the control module 104 for creating lane merging recommendations.

With continued reference to FIG. 1, the control module 104 selects one of the road segments 210, 212, 214 with the highest reliability score for use in creating lane merging recommendations. In some examples, when the reliability scores are generated according to different driving conditions, the control module 104 may select the road segment 210, 212, 214 with the highest reliability score having a driving condition that corresponds to a current driving condition associated with the vehicle 102. For instance, the control module 104 may determine the current driving condition (e.g., morning, afternoon, nighttime, bad weather, etc.) based on inputs from the sensors 110, 112, 114, inputs from other onboard sensors, and/or inputs from external sources. Then, based on the current driving condition, the control module 104 may select the road segment 210, 212, 214 with the highest reliability score for that equivalent driving condition.

Then, the control module 104 identifies a portion of the selected road segment optimal for merging from one lane (e.g., the lane 206) into another lane (e.g., the lane 208). For example, the control module 104 may divide the selected road segment into multiple portions (or multiple subsegments). In such examples, the portion of the selected road segment may be identified based on, for example, a probability of having a time gap to change lanes and a difference in vehicle speeds between the adjacent lanes (e.g., the lanes 206, 208), as further explained below.

For example, at a time of interest or another driving condition, the road segment 212 of FIG. 2 may have a greater reliability score than reliability scores for the road segments 210, 214. In this example, the control module 104 selects the road segment 212 and divides that road segment into multiple portions (e.g., two or more portions). Then, for each portion, the control module 104 may determine the probability of having a time gap to change lanes and a lane merge feasibility based on the probability. As further explained herein, the lane merge feasibility for each portion may be determined based on, for example, a number of vehicles, an expected headway, a vehicle speed, and speed difference with the vehicles in the adjacent lanes 206, 208.

In various embodiments, the control module 104 may determine the probability of having a time gap to change lanes and lane merge feasibility for each portion of the selected road segment (e.g., the road segment 212), according to equations (4)-(8) below. In such examples, the control module 104 may apply a probabilistic model to estimate a successful lane change probability, incorporating the assumption that a global positioning system (GPS) position, headway telemetry, host lane determination, and per-lane vehicle positions follow a Poisson point process of an expected headway. Here, the Poisson point process represents randomly located points. Such data may be collected from a headway sample record, which includes a latitude, a longitude, a heading, a headway, and timestamp data. In such examples, a headway is a measure of a temporal space between two vehicles (e.g., the vehicle 102 and another vehicle). For instance, the headway may be the time that elapses between the arrival of a leading vehicle at a designated test point and the arrival of a following vehicle at the same designated test point. The headway may be generally expressed in seconds per vehicle.

For example, an expected headway (λ) may be defined according to equation (4) below. Here, an average headway may be determined considering a headway sample (e.g., a designated headway H) from the crowdsourced telemetry data.

$$\lambda = avg(H) \qquad \text{Equation (4)}$$

Then, considering a virtual road segment ($S_0$) and the expected headway (λ), a vehicle count (V) in that virtual road segment ($S_0$) may be determined according to equation (5). In such examples, the virtual road segment ($S_0$) may correspond to a length of one of the portions in the selected road segments and the expected headway (λ) may be determined from equation (4) above.

$$V = S_0/\lambda \qquad \text{Equation (5)}$$

Then, the control module 104 may determine a time to perform a safe lane change, according to equation (6) below. For example, assuming an upcoming vehicle moves at a speed (v) and a safe lane change requires a vehicle gap distance ($d_0$), a time ($t_0$) to perform a safe lane change can be estimated with equation (6) below.

$$t_0 = d_0/v \qquad \text{Equation (6)}$$

The control module 104 may then determine a probability of having a time gap to change lanes in a particular portion of the selected road segment, according to equation (7) below. For example, in equation (7), the probability that a random time (t) is greater than the time ($t_0$) to perform a safe lane change is computed based on the expected headway (λ) determined above.

$$P(t > t_0) = e^{-\lambda t} \qquad \text{Equation (7)}$$

Because the vehicle 102 is switching from the lane 206 to the lane 208, it may be desirable to consider a difference in vehicle speeds between the adjacent lanes 206, 208. If the speed difference between the lanes is too large, a lane change is regarded as unsafe. In such examples, a defined speed difference threshold (Δvo) between the adjacent lanes 206, 208 may be applied to modify the lane change probability (determined in equation (7) above) for a particular portion of the selected road segment. This modified probability is referred to as a lane merge (or change) feasibility (LMF) and is determined according to equation (8) below. In equation (8), μ represents a constant scaling factor, Δv represents a speed difference between the adjacent lanes 206, 208 (e.g., an average speed difference of vehicles in the adjacent lanes 206, 208), and $f_0$ represents a minimum value of a lane merge feasibility which is required to safely lane merge. In such examples, the constant scaling factor (μ) may be greater than 0 and less than or equal to 1 (e.g., $0<\mu\le 1$). Additionally, as the value of the speed difference (Δv) increases, the value of the constant scaling factor (μ) decreases.

$$LMF = \mu P(t > t_0) - (1-\mu)\Delta v \ge f_0 \text{ when } \Delta v \ge \Delta v_0 \qquad \text{Equation (8)}$$

In various embodiments, it may be desirable to modify the lane change feasibility for each portion of the selected road segment based on, for example, driver characteristics, road conditions, etc. For example, the control module 104 may modify the probability of having a time gap to change lanes based on a cognitive status of a driver of the vehicle 102, which in turn modifies the lane change feasibility. As examples only, the cognitive status of the driver may relate to the driver's age, stress level, attentiveness, etc. In such examples, the required vehicle gap distance ($d_0$) may be increased in proportion to the driver's cognitive status, which can be ascertained from their driving behavior, provided via user input, etc. For example, a modified required vehicle gap distance ($d_m$) may be determined according to equation (9) below. In equation (9), $d_0$ represents the original required vehicle gap distance and delta (δ) represents a scaling factor determined based on the intensity of the driver's cognitive status. In such examples, the scaling factor may be greater for older drivers, higher levels of stress, etc. This modified required vehicle gap distance ($d_m$) may be used in place of the required vehicle gap distance ($d_0$) in equation (6) above, which in turn adjusts the time ($t_0$) to perform a safe lane change, the lane change probability, and the lane change feasibility of equations (6)-(8) above.

$$d_m = d_0 + \delta d_0 \quad \text{Equation (9)}$$

Additionally, in some examples, the control module 104 may modify the probability of having a time gap to change lanes based on a condition of the road, which in turn also modifies the lane change feasibility. For example, the road condition may vary depending on the weather and/or other external factors. In such examples, a poor road condition (e.g., icy, snow covered, snow packed, slushy, wet, etc.) may require an increased required vehicle gap distance as compared to a generally good condition (e.g., dry, etc.). As such, the required vehicle gap distance ($d_0$) may be increased in proportion to the road condition, which may be ascertained from sensor input. In such examples, equation (9) may be employed to determine a modified required vehicle gap distance ($d_m$), with the scaling factor (δ) representing a degree of the road condition. For instance, an icy road condition may have a larger scaling factor value than a wet road condition.

Also, in various embodiments, a speed (v) of an upcoming vehicle may be changed based on the road condition and/or the driver's cognitive status. For instance, and with respect to the road condition, a modified speed ($v_m$) may be determined according to equation (10) below. In equation (10), v represents the original speed of an upcoming vehicle (from equation (6) above) and delta (δ) represents a scaling factor determined based on a degree of the road condition, as explained above. This modified speed ($v_m$) may be used in place of the speed (v) in equation (6) above, which in turn adjusts the time ($t_0$) to perform a safe lane change, the lane change probability, and the lane change feasibility of equations (6)-(8) above.

$$v_m = v - \delta v \quad \text{Equation (10)}$$

Then, once the lane change feasibility for each portion of the selected road segment is known, the control module 104 can identify the portion most optimal for merging from one lane to another lane. For example, the most optimal portion for merging onto the exit lane 208 in FIG. 2 may be the portion with the highest lane change feasibility.

In various embodiments, the vehicle system 100 may take one or more actions based on the lane change feasibilities. In some examples, the vehicle system 100 may control one or more vehicle operations of the vehicle 102 based on the identified portion of the selected road segment. For instance, the control module 104 of FIG. 1 may transmit one or more signals representative of the identified portion to the vehicle control module 108. Then, the vehicle control module 108 may control at least one operation of the vehicle 102 based on the identified portion. For example, the vehicle control module 108 may generate a control signal for controlling the vehicle 102 to merge into the exit lane 208 (from the lane 206) when the vehicle 102 is in the identified portion of the selected road segment.

Additionally, the vehicle system 100 may display the selected road segment with the identified portion highlighted to indicate a recommendation of where to merge from the lane 206 into the exit lane 208. In such examples, the control module 104 may transmit one or more signals representative of the selected road segment, the portions thereof, their lane change feasibilities, the identified portion, etc. to the display module 106. The display module 106 may then output a visual representation of the selected road segment with some or all of the portions highlighted for driver viewing. In various embodiments, the visual representation may include only the identified portion highlighted. In other examples, the visual representation may include each portion (including the identified portion) highlighted in a different manner (e.g., a different color).

Figure 3:
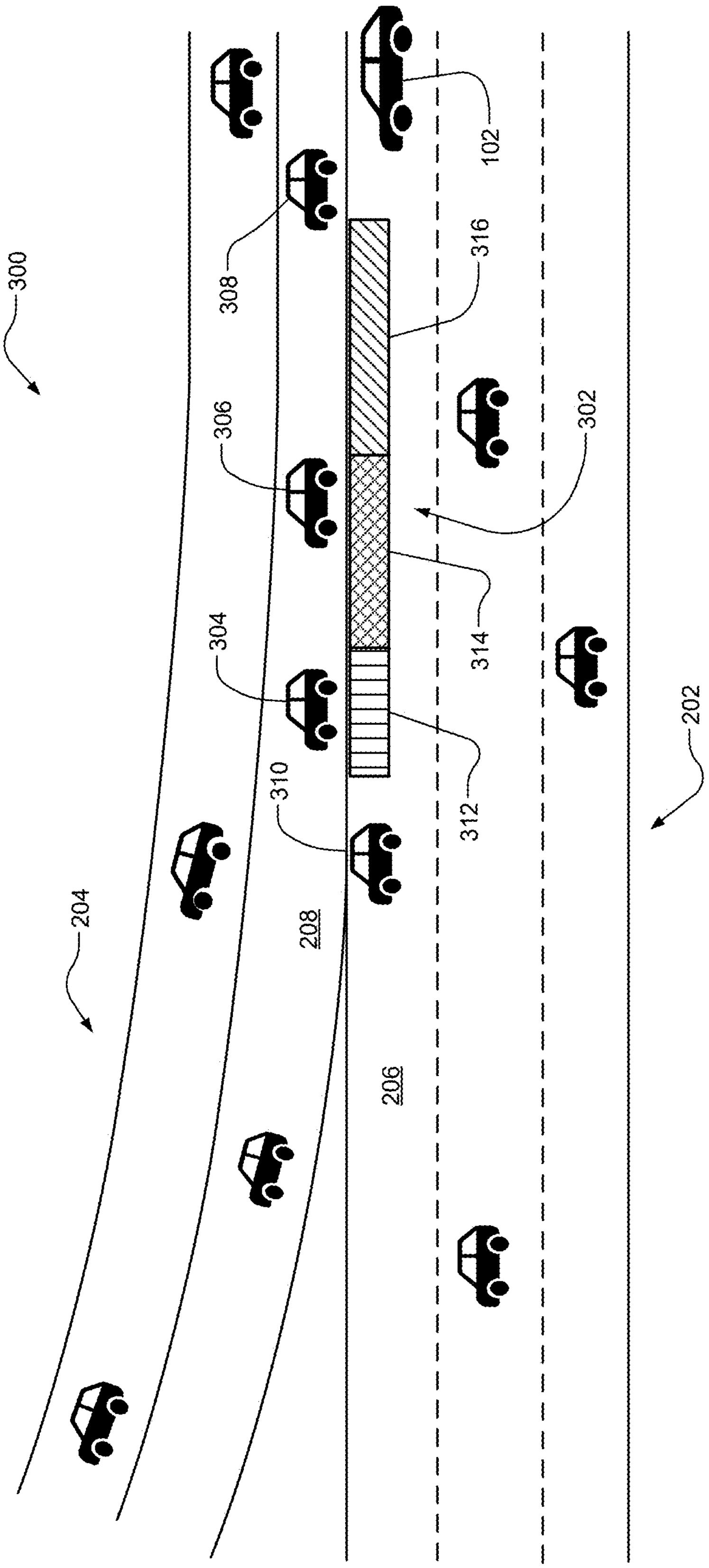
FIG. 3 is a visual representation of a map with a selected road segment having portions highlighted, according to the present disclosure.
Figure 4:
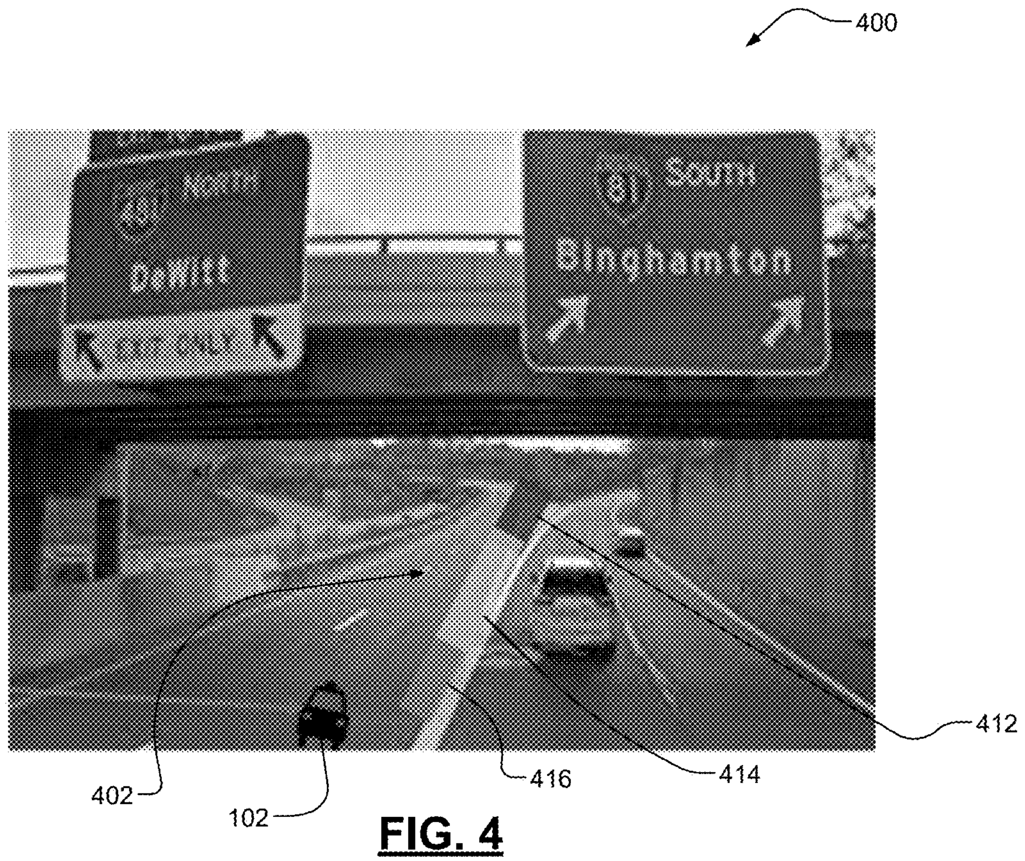
FIGS. 4-6 are example visual representations including selected road segments with portions highlighted, according to the present disclosure.

For example, FIG. 3 depicts a map 300 including a visual representation of a selected road segment having portions highlighted for driver viewing. As shown, the map 300 includes the road 202 and the exit 204 of FIG. 2 with the lanes 206, 208. In this example, a selected road segment 302 (e.g., the road segment 212 of FIG. 2) includes three portions 312, 314, 316. As shown, each portion 312, 314, 316 is highlighted in a different manner to signify a most optimal lane merge opportunity for the vehicle 102 and other (e.g., less optimal) lane merge opportunities. Specifically, in FIG. 3, the portion 316 is shown with diagonal lines representing the color green, the portion 314 is shown with crossed lines representing the color yellow, and the portion 312 is shown with vertical lines representing the color red. In this example, the portion 316 is identified (by the control module 104) as being the most optimal lane merge opportunity for the vehicle 102 based on a probability of having a time gap to change lanes (merge into the lane 208) and a difference in speeds of vehicles (e.g., vehicles 304, 306, 308, 310, etc.) between the lanes 206, 208.

FIGS. 4-8 depict other examples of visual representations 400, 500, 600, 700, 800 that may be provided by the display module 106, such as via a heads-up display in the vehicle 102. For example, in FIG. 4, the visual representation 400 includes a selected road segment 402 with portions 412, 414, 416. In this example, the portion 416 is highlighted green indicating the most optimal lane merge opportunity for the vehicle 102, and the portion 414 is highlighted yellow and the portion 412 is highlighted red indicating less optimal lane merge opportunities for the vehicle 102.

Figure 5:
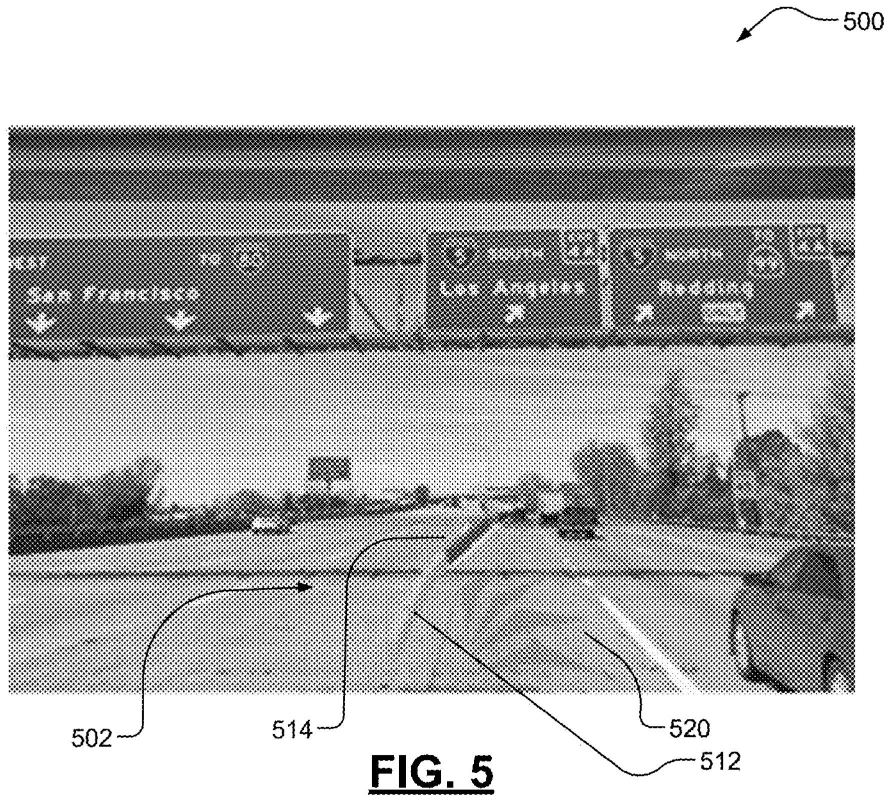

In FIG. 5, the visual representation 500 includes a selected road segment 502 with portions 512, 514. In this example, the portion 512 is highlighted green indicating the most optimal lane merge opportunity for the vehicle 102 and the portion 514 is highlighted red indicating less optimal lane merge opportunity for the vehicle 102. Additionally, in FIG. 5, the visual representation 500 includes arrows 520 directing the driver of the vehicle 102 to merge in in the portion 512.

Figure 6:
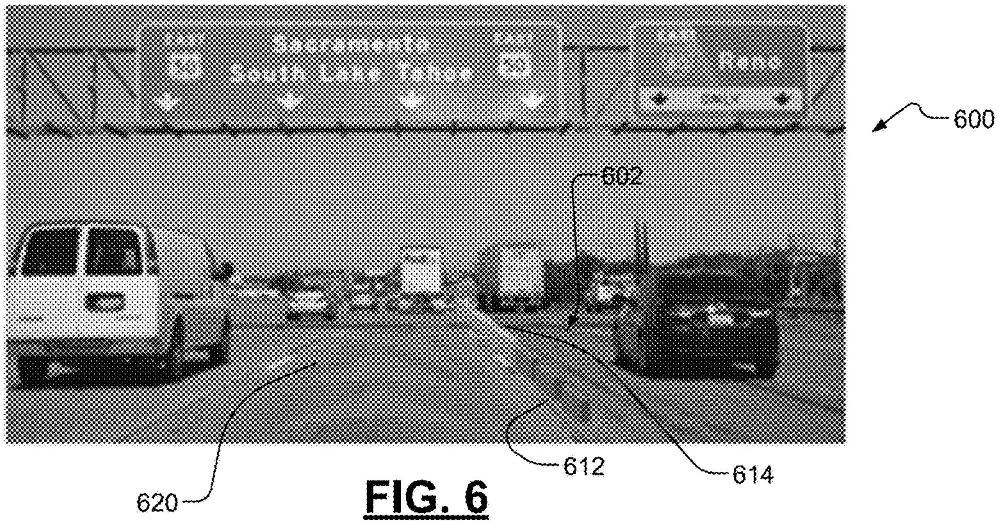

In FIG. 6, the visual representation 600 includes a selected road segment 602 with portions 612, 614. In this example, the portion 614 is highlighted green indicating the most optimal lane merge opportunity for the vehicle 102 and the portion 612 is highlighted red indicating less optimal lane merge opportunity for the vehicle 102. Like in FIG. 5, the visual representation 600 of FIG. 6 includes arrows 620 directing the driver of the vehicle 102 to merge in the portion 614.

Figure 7:
FIGS. 7-8 are example visual representations including notifications instructing a driver to merge, according to the present disclosure.
Figure 8:

In FIGS. 7-8, the visual representation 700, 800 provide examples of notifications instructing a driver to "merge to exit lane now."

FIGS. 9-12 illustrate example control processes 900, 1000, 1100, 1200 employable by the vehicle system 100 of FIG. 1. Although the example control processes 900, 1000, 1100, 1200 are described in relation to the vehicle system 100 of FIG. 1 including the control module 104, the display module 106, the vehicle control module 108, and/or the control module 116, any one of the control processes 900, 1000, 1100, 1200 may be employable by another suitable system and/or other suitable modules if desired.

Figure 9:
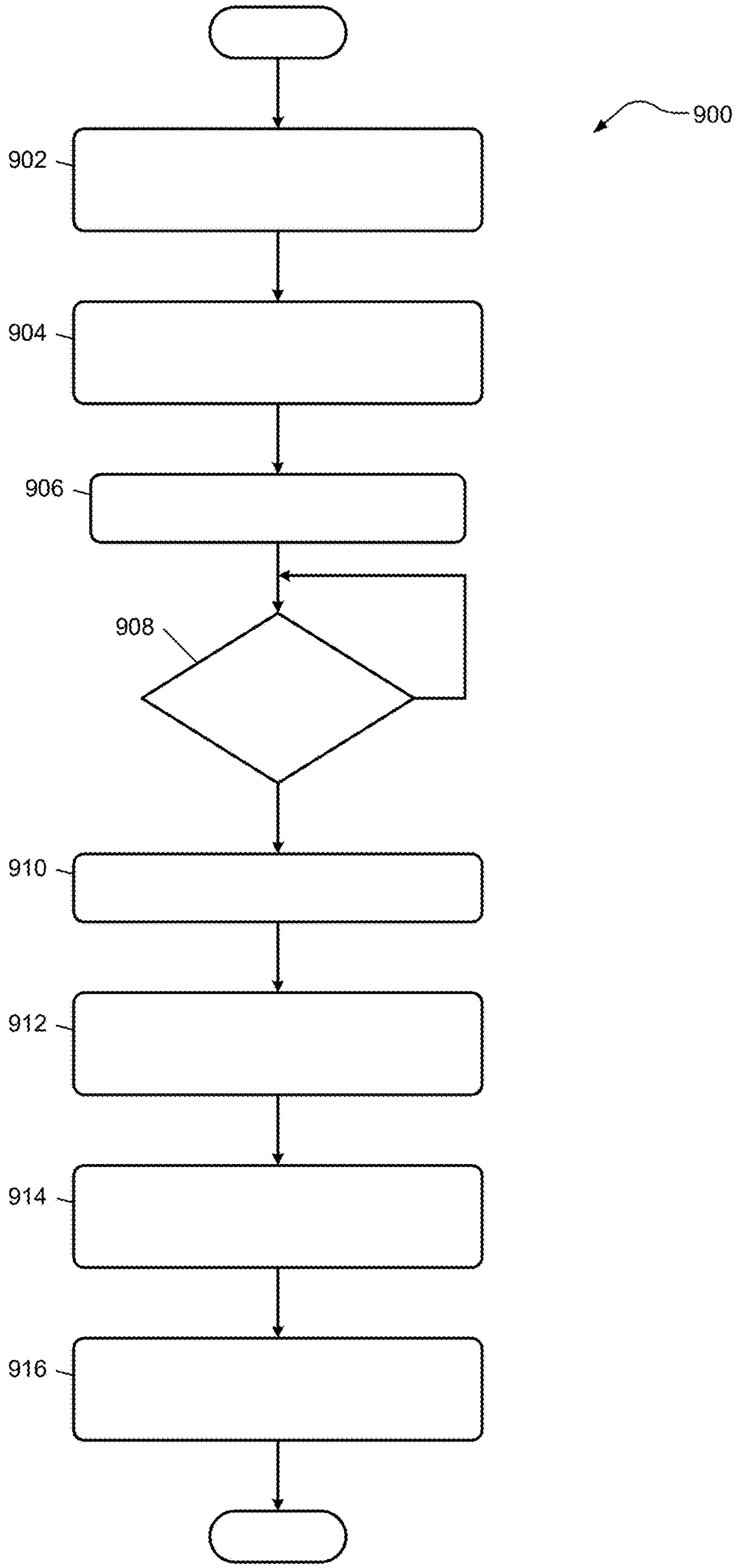
FIG. 9 is a flowchart of an example control process for providing visual representations of vehicle merge lane recommendations, according to the present disclosure.

The control process 900 is implemented for providing visual representations of vehicle merge lane recommendations. As shown in FIG. 9, the control process 900 begins at 902 by identifying road segments in a defined region for merging from one lane to another lane, such as from the lane 206 to the exit lane 208 of FIG. 2. In such examples, the control module 116 of FIG. 1 may identify such road segments based on based on crowdsourced data. For example, and as explained above, the control module 116 may cluster location data (from the crowdsourced data) in the defined region relating to where vehicles have merged from the lane 206 to the lane 208 and then identify road segments associated with each cluster. The control process 900 then proceeds to 904.

At 904, the control module 116 determines one or more reliability scores for each road segment for different driving conditions. For example, and as explained above, the control module 116 may determine the reliability score(s) based on the frequency of which the vehicles have traveled along the road 202 at the exit 204. In such examples, the control module 116 may determine familiarity scores for the vehicles and then determine the reliability scores for the road segments based on the familiarity scores, as explained above. The control process 900 then proceeds to 906.

At 906, the control module 116 optionally modifies the reliability scores based on one or more conditions. For example, and as explained above, the control module 116 may modify the reliability scores based on the frequency of braking incidents, the total time taken to merge by all vehicles, etc. The control process 900 then proceeds to 908.

At 908, control determines whether the vehicle 102 is approaching a region with a desired lane merge. For example, the control module 104 of FIG. 1 may make this determination based on inputs from a navigation system (e.g., a mapping system) tracking and providing instructions about upcoming maneuvers to reach a desired location. If yes at 908, the control process 900 proceeds to 910. Otherwise, if no at 908, the control process 900 returns to 908. In other examples, the control process 900 may return to another suitable step (e.g., 902, etc.) if desired.

At 910, the control module 104 determines a current driving condition associated with the vehicle 102. For example, and as explained above, the control module 104 may determine the current driving condition based on inputs from the sensors 110, 112, 114, inputs from other onboard sensors, and/or inputs from external sources. The control process 900 then proceeds to 912, where the control module 104 selects a road segment of the identified road segments with the highest reliability score that corresponds to the current driving condition. The control process 900 then proceeds to 914.

At 914, the control module 104 identifies a portion of the selected road segment optimal for merging from the lane 206 to the lane 208. In such examples, the control module 104 may identify this portion based on a probability of having a time gap to change lanes and a difference in vehicle speeds between the lanes 206, 208 (e.g., a lane merge feasibility). For example, and as explained above, the control module 104 may divide the selected road segment into multiple portions, determine a probability of having a time gap to change lanes for each portion, and then a lane merge feasibility based on the probability and a difference in vehicle speeds for each portion. Then, the control module 104 may identify the portion of the selected road segment with the highest lane merge feasibility as being optimal for merging. The control process 900 then proceeds to 916.

At 916, the display module 106 outputs a visual representation of the selected road segment with some or all of the portions highlighted (including the identified portion) for driver viewing, as explained above. The control process 900 then ends as shown in FIG. 9. Alternatively, the control process 900 may return to another step, such as 908 if desired.

Figure 10:
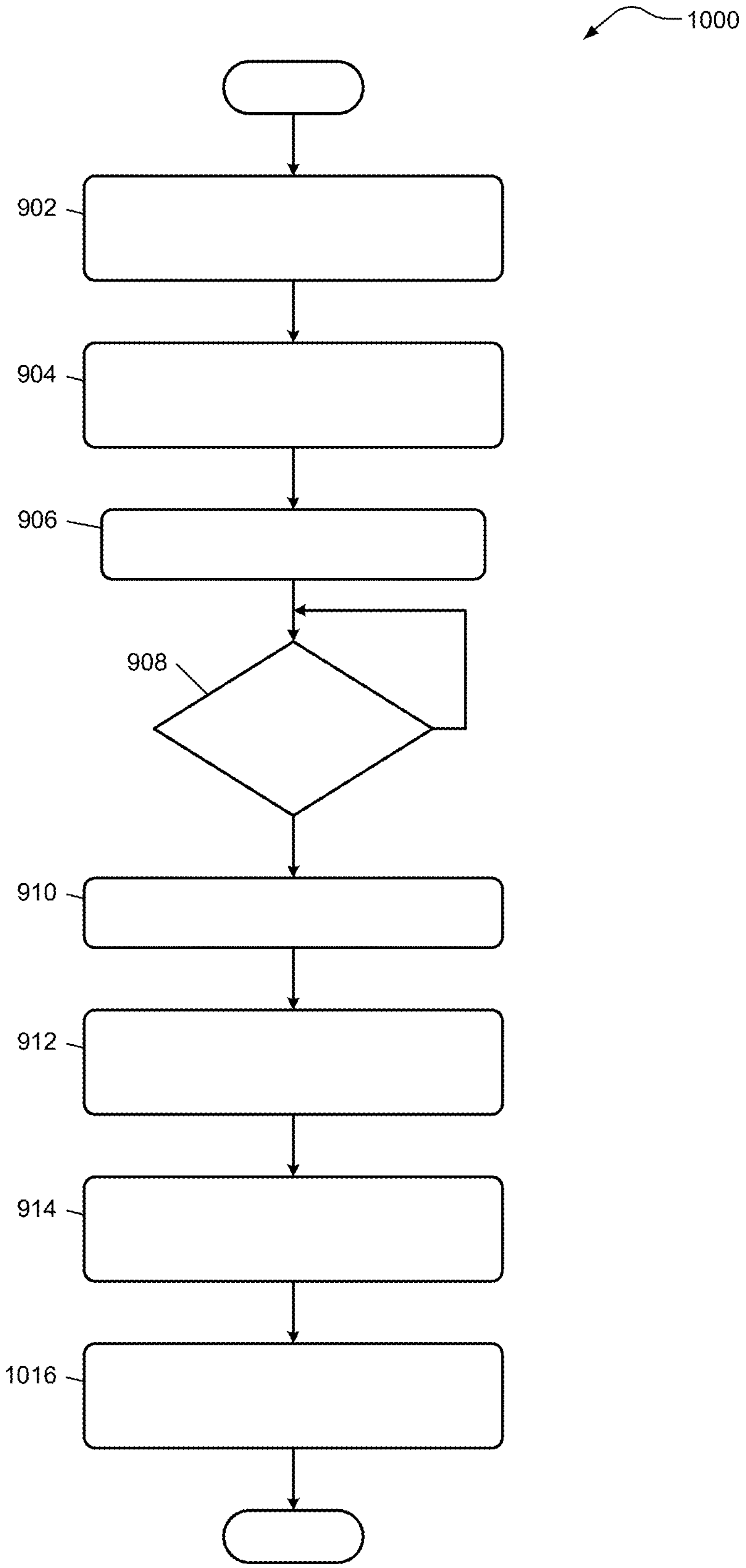
FIG. 10 is a flowchart of an example control process for controlling a vehicle to merge based on vehicle merge lane recommendations, according to the present disclosure.

The control process 1000 of FIG. 10 is implemented for controlling a vehicle to merge based on vehicle merge lane recommendations. In FIG. 10, the control process 1000 is similar to the control process 900 of FIG. 9 but includes an alternative step. For example, and as shown in FIG. 10, the control process 1000 includes 902, 904, 906, 908, 910, 912, 914 of FIG. 9 as explained above, and then proceeds to 1016. At 1016, the vehicle control module 108 controls at least one operation of the vehicle 102 based on the identified portion (from 914). For example, and as explained above, the vehicle control module 108 may generate a control signal for controlling the vehicle 102 to merge into the exit lane 208 (from the lane 206) when the vehicle 102 is in the identified portion of the selected road segment. The control process 1000 then ends as shown in FIG. 10. Alternatively, the control process 1000 may return to another step, such as 908 if desired.

Figure 11:
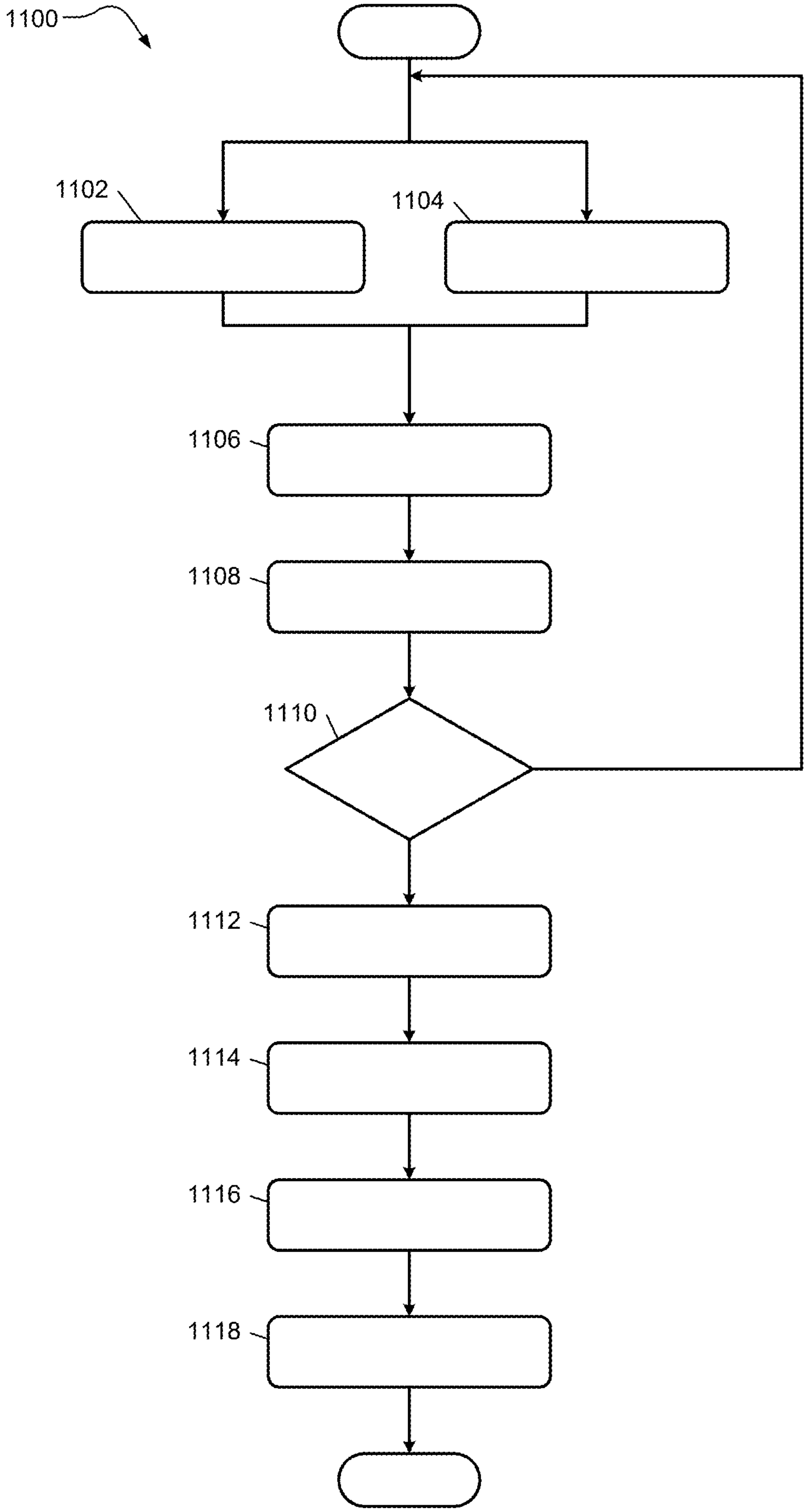
FIG. 11 is a flowchart of an example control process for determining familiarity scores, according to the present disclosure.
Figure 12:
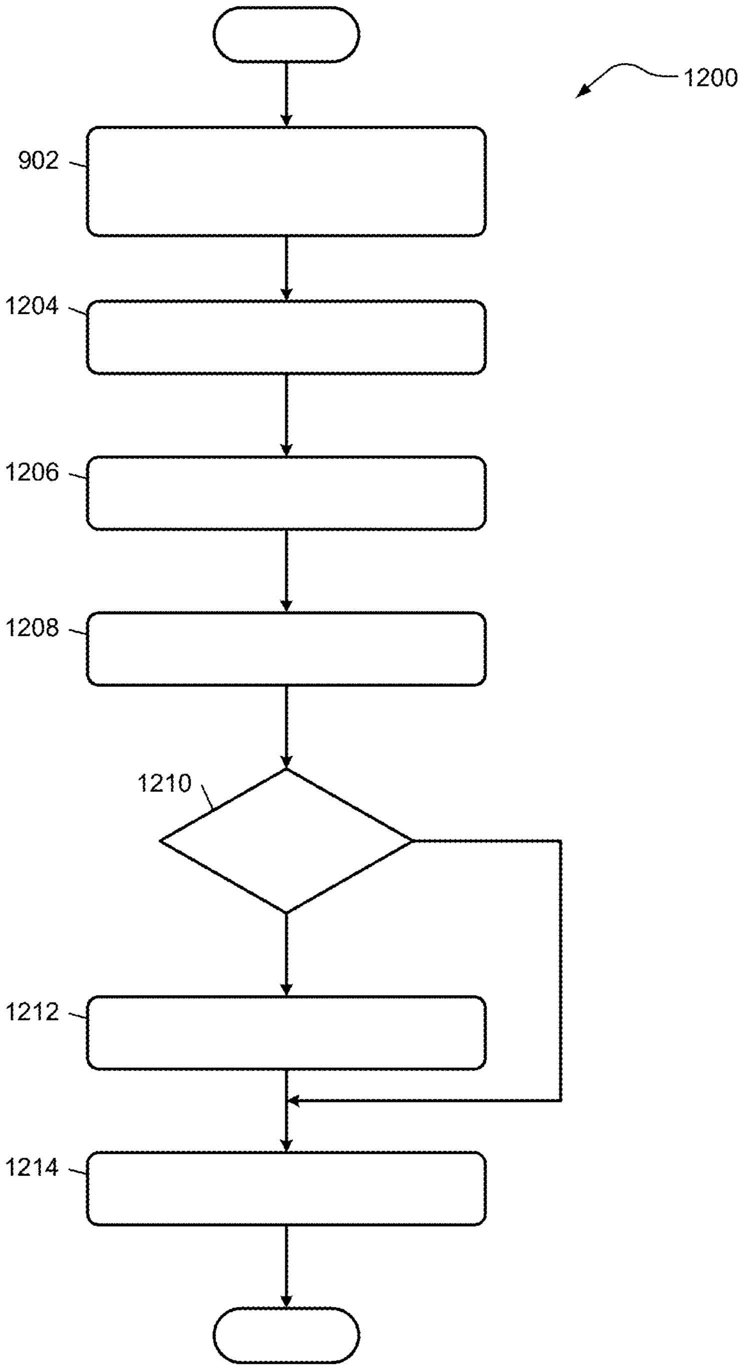
FIG. 12 is a flowchart of an example control process for determining reliability scores, according to the present disclosure.

The control processes 1100, 1200 of FIGS. 11 and 12 are implemented for determining familiarity scores and reliability scores, respectively. In FIG. 11, the control process 1100 begins at 1102, 1104. At 1102, the control module 116 receives crowdsourced telemetry data (as explained above). At 1104, the control module 116 receives road level map data (e.g., an open street map (OSM), etc.). Then, the control process 1100 proceeds to 1106. At 1106, the control module 116 implements a map matching process to coordinate the crowdsourced telemetry data and the road level map data. The control process 1100 then proceeds to 1108.

At 1108, the control module 116 receives lane level map data. For example, the lane level map data may include detailed information (e.g., lane level details), such as lane boundaries, associated timestamps, etc. The control process 1100 then proceeds to 1110, where the control module 116 determines if a lane change/merge is detected. In such examples, this determination may be made based on the coordinated crowdsourced telemetry data and the road level map data, and the lane level map data. If yes at 1110, the control process 1100 proceeds to 1112, 1114. If no at 1110, the control process 1100 returns to 1102, 1104.

At 1112, the control module 116 aggregates location data from the crowdsourced telemetry data. Then, at 1114, the control module 116 aggregates vehicle IDs associated with the location data. For example, the control module 116 may aggregate particular location data relative to a defined region at the lane change/merge location and the vehicle IDs for the vehicles providing such location data. The control process 1100 then proceeds to 1116.

At 1116, the control module 116 determines a cumulative frequency for the vehicles based on the vehicle IDs. For example, the control module 116 may identify each vehicle (based on its vehicle ID) that has passed the exit 204 and separate the vehicle occurrences based on the level of area familiarity of the vehicles. In such examples, the vehicle occurrences for different levels of familiarity may be aggregated into multiple, distinct vehicle counts. In this example, each vehicle count may represent a number of vehicles which pass the exit 204 per a defined time occurrence (e.g., daily, weekly, etc.). Each vehicle count may relate to a frequency of which the vehicles have traveled through the defined region. The control process 1100 then proceeds to 1118.

At 1118, the control module 116 determines familiarity scores for the vehicles in each road segment based on the cumulative frequency of 1116 and weighted values. For example, and as explained above, the control module 116 may determine familiarity scores by multiplying each vehicle count for a different level of familiarity and a corresponding weight value. The control process 1100 then ends as shown in FIG. 11.

In FIG. 12, the control process 1200 begins at 902 of FIG. 9, where the control module 116 identifies road segments in a defined region for merging from one lane to another lane, such as from the lane 206 to the exit lane 208 of FIG. 2. The control process 1200 then proceeds to 1204.

At 1204, the control module 116 determines familiarity scores for vehicles in the road segments. For example, the control module 116 may implement the control process 1100 of FIG. 11 for determining the familiarity scores. The control process 1200 then proceeds to 1206, where the control module 116 determines a reliability score for each road segment. For example, and as explained above, the control module 116 may determine such reliability scores according to equation (1). The control process 1200 then proceeds to 1208, the control module 116 may optionally determine reliability scores for each road segment for different driving conditions (as explained above). The control process 1200 then proceeds to 1210.

At 1210, the control module 116 determines whether modifications to the reliability scores are desired. This may be determined based on user input, detected driving characteristics of other vehicles, etc. If yes at 1210, the control process 1200 proceeds to 1212. If no at 1210, the control process 1200 proceeds to 1214.

At 1212, the control module 116 modifies the reliability scores based on one or more conditions. For example, and as explained above, the control module 116 may modify the reliability scores based on the frequency of braking incidents, the total time taken to merge by all vehicles, etc. The control process 1200 then proceeds to 1214.

At 1214, the control module 116 stores information for each road segment in a database. For example, and as explained above, the control module 116 may store the determined reliability scores (whether modified or not) for the different road segments along with driving conditions corresponding to the reliability scores. This database (or data therein) may be accessible and/or provided to the control module 104 for creating lane merging recommendations, as explained above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for providing an optimal road segment recommendation to make a desired lane change for a vehicle, the vehicle system:

a control module configured to:

identify, based on crowdsourced data from a plurality of vehicles over a period of time that have traveled through a defined region of a road, a plurality of road segments in the defined region of a first lane for merging into a second lane, wherein the crowdsourced data includes a frequency of which each vehicle of the plurality of vehicles has traveled through the defined region of the road and a frequency of braking incidents for the plurality of vehicles in the defined region of the road;

determine one or more reliability scores for each road segment in the defined region of the road based on the frequency of which each vehicle of the plurality of vehicles has traveled into the defined region of the road and based on the frequency of braking incidents, wherein each reliability score for each road segment is specific to a different driving condition;

select a road segment of the road segments with the highest reliability score having the driving condition that corresponds to a current driving condition associated with the vehicle; and identify a portion of the selected road segment optimal for merging from the first lane into the second lane based on a probability of having a time gap to change lanes and a difference in vehicle speeds between the first lane and the second lane; and a display module in communication with the control module, the display module configured to output a visual representation of the selected road segment including the identified portion highlighted to indicate a recommendation of where to merge from the first lane into the second lane.

2. The vehicle system of claim 1, further comprising a vehicle control module in communication with the control module, the vehicle control module configured to control at least one operation of the vehicle based on the identified portion of the selected road segment.

3. The vehicle system of claim 1, wherein the plurality of road segments in the defined region correspond to a set of road segments most used by the plurality of vehicles to merge into the second lane.

4. The vehicle system of claim 1, wherein the control module is configured to determine familiarity scores for the plurality of vehicles in each road segment based on the frequency of which the plurality of vehicles have traveled through the defined region of the road.

5. The vehicle system of claim 4, wherein the control module is configured to determine the one or more reliability scores for each road segment based on the familiarity scores for that road segment.

6. The vehicle system of claim 1, wherein the driving condition includes at least one of a different time of day, a different road condition, and a different weather condition.

7. The vehicle system of claim 1, wherein the control module is configured to modify the probability of having a time gap to change lanes based on a cognitive status of a driver of the vehicle.

8. The vehicle system of claim 1, wherein the control module is configured to modify the probability of having a time gap to change lanes based on a condition of the road.

9. A vehicle system for providing an optimal road segment recommendation to make a desired lane change for a vehicle, the vehicle system:

a control module configured to:

identify, based on crowdsourced data from a plurality of vehicles over a period of time that have traveled through a defined region of a road, a plurality of road segments in the defined region of a first lane for merging into a second lane, wherein the crowdsourced data includes a frequency of which each vehicle of the plurality of vehicles has traveled through the defined region of the road and a frequency of braking incidents for the plurality of vehicles in the defined region of the road;

determine one or more reliability scores for each road segment in the defined region of the road based on the frequency of which each vehicle of the plurality of vehicles has traveled into the defined region of the road and based on the frequency of braking incidents, wherein each reliability score for each road segment is specific to a different driving condition;

select a road segment of the road segments with the highest reliability score having the driving condition that corresponds to a current driving condition associated with the vehicle; and identify a portion of the selected road segment optimal for merging from the first lane into the second lane based on a probability of having a time gap to change lanes and a difference in vehicle speeds between the first lane and the second lane; and a vehicle control module in communication with the control module, the vehicle control module configured to control the vehicle to merge into the second lane in the identified portion of the selected road segment.

10. The vehicle system of claim 9, wherein the plurality of road segments in the defined region correspond to a set of road segments most used by the plurality of vehicles to merge into the second lane.

11. The vehicle system of claim 9, wherein the control module is configured to determine familiarity scores for the plurality of vehicles in each road segment based on the frequency of which the plurality of vehicles have traveled through the defined region of the road.

12. The vehicle system of claim 11, wherein the control module is configured to determine the one or more reliability scores for each road segment based on the familiarity scores for that road segment.

13. The vehicle system of claim 9, wherein the driving condition includes at least one of a different time of day, a different road condition, and a different weather condition.

14. The vehicle system of claim 9, wherein the control module is configured to modify the probability of having a time gap to change lanes based on a cognitive status of a driver of the vehicle.

15. The vehicle system of claim 9, wherein the control module is configured to modify the probability of having a time gap to change lanes based on a condition of the road.

16. A vehicle control method for providing an optimal road segment recommendation to make a desired lane change for a vehicle, the vehicle control method comprising:

identifying, based on crowdsourced data from a plurality of vehicles over a period of time that have traveled through a defined region of a road, a plurality of road segments in the defined region of a first lane for merging into a second lane, wherein the crowdsourced data includes a frequency of which each vehicle of the plurality of vehicles has traveled through the defined region of the road and a frequency of braking incidents for the plurality of vehicles in the defined region of the road;

determining one or more reliability scores for each road segment in the defined region of the road based on the frequency of which each vehicle of the plurality of vehicles has traveled into the defined region of the road and based on the frequency of braking incidents, wherein each reliability score for each road segment is specific to a different driving condition;

selecting a road segment of the road segments with the highest reliability score having the driving condition that corresponds to a current driving condition associated with the vehicle;

identifying a portion of the selected road segment optimal for merging from the first lane into the second lane based on a probability of having a time gap to change lanes and a difference in vehicle speeds between the first lane and the second lane; and outputting a visual representation of the selected road segment including the identified portion highlighted to indicate a recommendation of where to merge from the first lane into the second lane.

17. The vehicle control method of claim 16, further comprising controlling the vehicle to merge into the second lane in the identified portion of the selected road segment.

18. The vehicle control method of claim 16, further comprising at least one of:

modifying the probability of having a time gap to change lanes based on a cognitive status of a driver of the vehicle; and modifying the probability of having a time gap to change lanes based on a condition of the road.

19. The vehicle control method of claim 16, wherein:

the vehicle control method further includes determining familiarity scores for the plurality of vehicles in each road segment based on the frequency of which the plurality of vehicles have traveled through the defined region of the road; and determining one or more reliability scores for each road segment in the defined region of the road includes determining the one or more reliability scores for each road segment based on the familiarity scores for that road segment.

20. The vehicle control method of claim 16, wherein the driving condition includes at least one of a different time of day, a different road condition, and a different weather condition.

* * * * *